United States Patent [19]

Guillemet et al.

[11] 4,415,971
[45] Nov. 15, 1983

[54] APPARATUS FOR MANAGING THE DATA TRANSFERS BETWEEN A MEMORY UNIT AND THE DIFFERENT PROCESSING UNITS OF A DIGITAL DATA PROCESSING SYSTEM

[75] Inventors: Michel J. Guillemet, Palaiseau; Michel Isert, Paris, both of France

[73] Assignee: CII Honeywell Bull, Paris, France

[21] Appl. No.: 249,409

[22] Filed: Mar. 31, 1981

[30] Foreign Application Priority Data

Apr. 1, 1980 [FR] France .............................. 80 07288

[51] Int. Cl.³ ...................... G06F 13/00; G06F 15/16
[52] U.S. Cl. .................................................. 364/200
[58] Field of Search ...................... 364/200 MS File

[56] References Cited

U.S. PATENT DOCUMENTS

| | | | |
|---|---|---|---|
| 3,581,291 | 5/1971 | Iwamoto et al. | 364/200 |
| 3,771,137 | 11/1973 | Barner et al. | 364/200 |
| 3,928,857 | 12/1975 | Carter et al. | 364/200 |
| 4,051,461 | 9/1977 | Hashimoto et al. | 364/200 |
| 4,056,844 | 11/1977 | Izumi | 364/200 |
| 4,092,713 | 5/1978 | Scheuneman | 364/200 |
| 4,095,269 | 6/1978 | Kawabe et al. | 364/200 |
| 4,181,937 | 1/1980 | Hattori et al. | 364/200 |

*Primary Examiner*—Thomas M. Heckler
*Attorney, Agent, or Firm*—Lowe, King, Price & Becker

[57] ABSTRACT

Transfers of information items between a memory array and different processing units of a digital data processing system are managed. Interface unit DIM connected between the system memory array and coupling bus BUSA for the different processing units of the system, comprises buffers PB, RBO, RB1, respectively associated with circuits CA2, CA1 and CA3 for aligning information items. Transfers of information items relating to instructions and data pass through these buffers. The transfers are automatic as a function of space available in these buffers. The framing and length of the information items are controlled automatically by microfunctions which greatly simplify operations for the microprogrammer for the information items which are octet aligned and of variable length.

4 Claims, 10 Drawing Figures

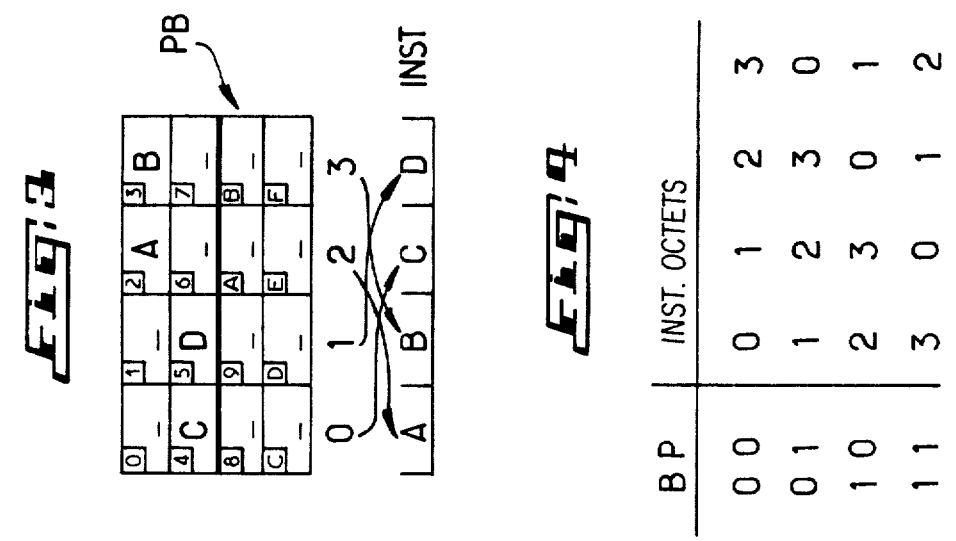
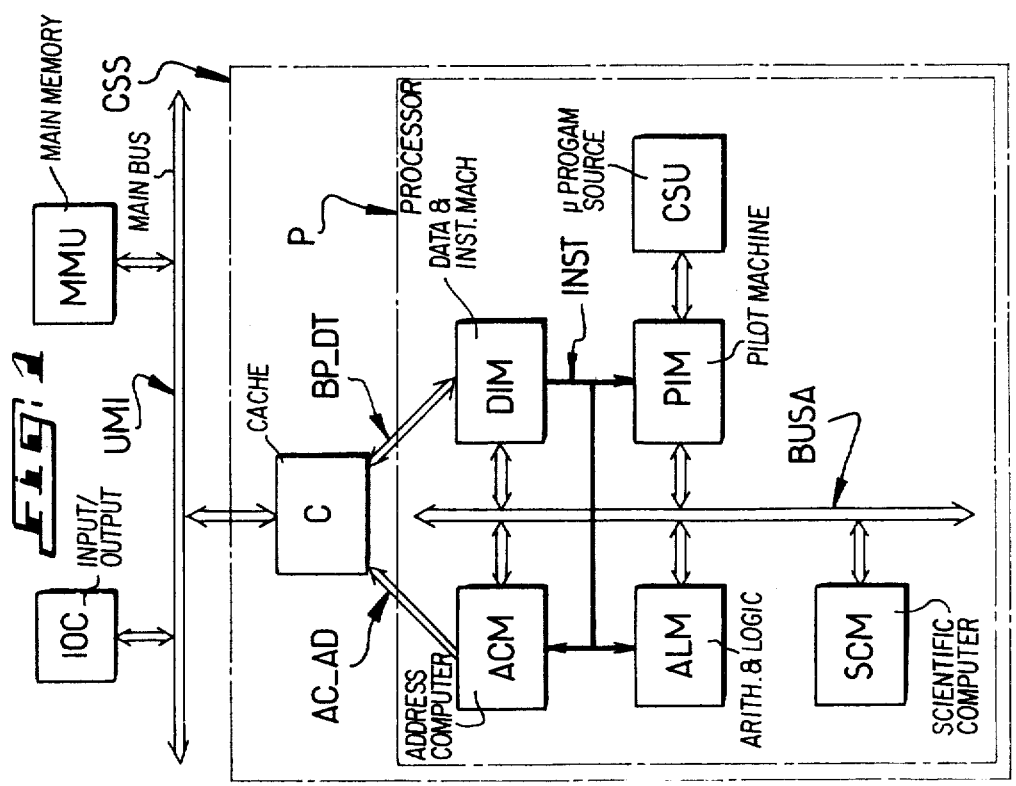

| | $i_0$ | $i_1$ | $i_2$ | $i_3$ | $i_4$ | $i_5$ | $i_6$ |
|---|---|---|---|---|---|---|---|
| | IWT | PUT | IWT | | | IWT | IWT |
| BUSA | ABCD | EFGH | | | | | |
| REQUESTS | | DIRQ ACRQ RQA | DIRQ DTA | DIRQ ACRQ RQA | DTA | | |
| WB | | ..AB CD.. | ..AB CDEF GH.. | | | | |
| BP_DT | | | ..AB | | CDEF | GH.. | |
| BP | | A | E | – | – | – | – |
| BC | | 3 | -1 | – | – | – | – |
| MP | | 6 | – | 8 | – | C | E |
| AMP | | 6 | 8 | – | 10 | – | – |
| AMC | | 7 | 5 | – | -1 | – | – |

APPARATUS FOR MANAGING THE DATA TRANSFERS BETWEEN A MEMORY UNIT AND THE DIFFERENT PROCESSING UNITS OF A DIGITAL DATA PROCESSING SYSTEM

BACKGROUND OF THE INVENTION

1 Field of Invention

In general terms, the present invention relates to an apparatus for conveying a particular image of a memory array of a data processing system to a microprogrammer for writing of microprograms for implementating a processor task of the system, wherein the image which contains aligned bits and is of variable length, without any regard to problems respecting data framing and response periods of the memory array. More specifically, the present invention relates to an apparatus for managing data transfers between a memory array and different processing units of the system while a task is implemented by a processor of the system, while minimizing the number of memory accesses.

2. Description of the Prior Art

As a rule, the data to be read or written in a memory array of a digital data processing system during the implementation of a task by a processor of the system, essentially comprise chains of octets having optional length. The initial octet is located at an optional address with progression of the addresses towards the right or left. The data transfers relating to instructions, as well as to information, are all under the control of a set of pre-recorded microprograms. These microprograms are called up selectively and performed during the implementation of a task.

A microprogrammer who writes these microprograms should make allowance for the structure of the data, for the data recording mode in the memory array, for the data length and the data framing. Furthermore, the data relating to instructions and to information items are transferred as and when required.

One of the objects of the invention is to enable these microprograms to be more simply written by optimum freeing of the microprogrammer from the restrictions imposed by the indentifications of the data which are to be processed. In these circumstances, the restrictions eliminated at the microprogram writing stage are taken into account and managed automatically by the system in accordance with the invention.

Another object of the invention is to control the data transfers at the instruction stage as well as at the information item stage in such a manner as to limit memory accesses as much as possible and thereby save time in the implementation of a task. This management of the transfers is provided automatically by the system in accordance with the invention.

Another object of the invention is to gain freedom from the constrictions imposed by the variable response periods of the memory array, which response periods depend on the configuration of the system.

SUMMARY OF THE INVENTION

The invention consequently proposes an apparatus for managing data transfers between a memory array and different processing units during the performance of a task by a digital data processing system comprising at least one processor associated with a cache-memory, a main memory unit, the cache-memory and the main memory unit forming the memory array, an input-output unit, and a sub-system including the processing units interconnected via at least one connecting bus or multiple connector. The apparatus includes an interface unit characterised in that it consists:

in interposed within the sub-system, between the memory array and the processing units of the system. The interface unit comprises a set of buffer memories referred to as buffers, which store data relating to instructions of a program which is to be implemented and to be transferred to the processing units.

The buffers also store information items relating to data requested by the processing units from the memory array or to be written in the memory array.

Data relating to instructions are automatically transferred between the memory array and the interface unit before these instructions are actually implemented.

Data relating to information items are automatically transferred between the memory array and the interface unit, before the information items are used by the processing units.

Data relating to information items are automatically transferred between the processing units and the memory array. These automatic transfers are independent of the microprograms which implement the instructions applicable to the processing of a task.

According to another feature of the invention, a process comprises conveying to the microprogrammer having the task of writing the microprograms for implementation of the instructions of a program, a variable length image of an octet aligned memory array and of automatically controlling, by means of microfunctions, all of the problems applicable to framing and to length of the data which are to be transferred.

According to another feature of the invention, the process involves controlling the contents of the different buffers of the interface unit by means of counters and locators. The contents are controlled as a function of the availability of these buffers to receive and transmit data between the memory array and the processing units of the system.

According to another feature of the invention, the process involves automatic transmission by the interface unit of requests for automatic transfers of data relating to instructions or to items of information from the memory array to at least one buffer referred to as an interface unit reader buffer. This transfer occurs as soon as the interface unit reader buffer has enough space available to receive at least a part of these data.

According to another feature of the invention, there is an automatic transmission, by the interface unit of requests for automatic transfers of data relating to items of information. The automatic transmission is between at least one buffer, referred to as a write buffer of the interface unit, and the memory array. The automatic transmission occurs as soon as the write buffer contains at least a part of these data.

According to another feature of the invention, the process involves automatically placing on standby the implementation of a microprogram if the data requested by this microprogram are not yet available in the buffer allocated to the interface unit.

According to another feature of the invention, the process involves automatically transferring chains of octets between the memory array and the processing units without the microprogrammer being appraised by the length of these chains at the beginning of the transfer. The end of a chain is detected automatically at the level of the buffers allocated to the interface unit and which store these chains of octets.

According to another feature of the invention, the process involves using priority circuits for managing the priority of data transfer requests when several buffers of the interface unit derive a data transfer request.

According to another feature of the invention, a data alignment circuit is connected between the read buffer of the interface unit and the connecting bus coupling the different processing units of the sub-system, and a data alignment circuit is connected between this connecting bus and the write buffer of the interface unit. These alignment circuits automatically controlling the data framing established by first least significant bits of the memory addresses of these data.

The invention equally proposes a device for performing the application of the method. The device essentially comprises an interface unit including a program buffer storing the data applicable to the instructions of a program which is to be implemented. At least one read buffer stored the data transmitted from the memory array of the system to the processing units of the system. At least one write buffer stored the data applicable to items of information originating from the processing units of the system and which are to be written into the memory array of the system. The read and write buffers are connected on the one hand to the memory array of the system and to the connecting bus connecting the different processing units. The program buffer is connected to the memory array of the system and to particular processing units of the system via unidirectional connecting lines.

According to another feature of the device in accordance with the invention, the changes in the contents of the aforesaid buffers are controlled automatically by counters and by locators kept abreast by microfunctions.

According to another feature of the invention, data aligning circuits, allocated to the buffers of the interface unit automatically control framing of these data.

A substantial advantage of the invention is that tasks of the microprogrammer who writes microprograms for implementation of instructions, is simplified considerably since there is no need to be concerned unduly about data framing problems and about the response periods of the memory array. As a matter of fact, all of these problems are taken into account by the aforesaid interface unit which moreover assures perfect synchronization between the implementation of the microprograms and the data transfers between the memory array and the processing units of the system.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

FIG. 1 is a diagrammatical illustration of one embodiment of a data processing system utilizing the invention;

FIG. 3 is an illustration of the program buffer of the DIM unit in the case of a transfer of data relating to an instruction of a program which is to be implemented;

FIG. 4 is a table showing the method of transferring the different octets of the aforesaid instruction which is to be implemented, wherein the transfer is between the program buffer and the processing unit of the system having the task of decoding this instruction;

FIG. 5 is a format diagram of a chain of octets recorded in the cache-memory of the processor of the system, which chain is to be transferred into one of the processing units of the system;

FIG. 6 is a diagram of the different transfer stages of the octet chain illustrated in FIG. 5;

FIGS. 7 and 8 are illustrations similar to FIGS. 5 and 6, of another example of a transfer of a chain of octets between the cache-memory of the processor and one of the processing units of the system;

FIG. 9 is a format diagram of a chain of octets which is to be transferred from one of the processing units of the system to the memory array of the system; and FIG. 10 is a diagram of the different stages of the transfer of the chain of octets illustrated in FIG. 9.

Figure 2:
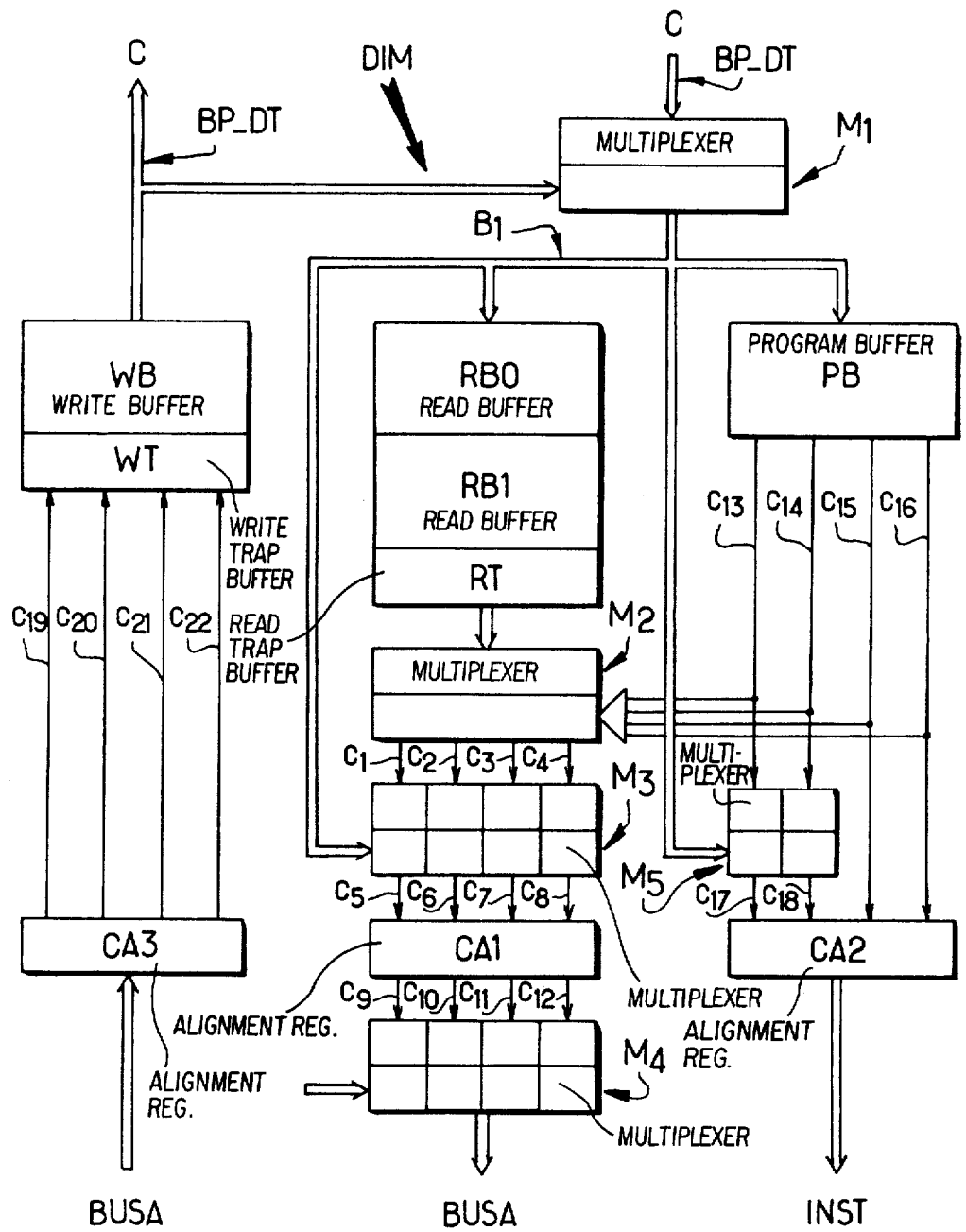
FIG. 2 is a simplified schematic illustration of the principal component elements of the interface unit DIM illustrated in FIG. 1.

Before describing the invention with reference to the drawings, it is to be noted that the different units, registers, signals, buffers utilised by the system which will be described in the following will be denoted by the abbreviations of the terms in current use, in order to provide a better understanding by one versed in the art. A list of these abbreviations is given below:

ACM: Address Computation Machine
ALM: Arithmetic and Logic Machine
CSS: Central Sub-System
CSU: Control Store Unit
DIM: Data and Instruction Machine
IOC: Input-Output Controller
MMU: Main Memory Unit
PIM: Pilot Machine
SCM: Scientific Computation Machine
BP: BUSA Pointer
BC: BUSA Counter
MP: Memory Pointer
AMP: Advanced Memory Pointer
AMC: Advanced Memory Counter
DIRQ: DIM Request
ACRQ: ACM Request
RQA: Request Accepted
DTA: Data Available
BP-DT: Bus Processor-Data
WB: Write Buffer
RBO: Read Buffer No. 0
RB1: Read Buffer No. 1
PB: Program Buffer
RT: Read Trap Buffer
WT: Write Trap Buffer

DETAILED DESCRIPTION OF THE DRAWING

In FIG. 1 is illustrated a digital data processing system comprising at least:
 one main memory unit MMU
 one processor P which includes a cache C or rapid access low-capacity memory, and
 an input-output unit IOC.
 the processor P and cache C thereof form part of a sub-system CSS comprising several units, among which are:
 a DIM unit for performing several memory access actions either in a cache C or in the main memory unit MMU,
 an ACM unit for performing the different address calculations for the data to be read in the memory array of the system comprising the main memory unit MMU and the cache C of the processor P, an ALM unit for performing the different arithmetic and logic operations, a PIM unit for establishing the different connections between the different units of the sub-system CSS, a CSU unit which stores the different microprograms for assuring the implementation of a task by the sub-system CSS, and an SCM unit for performing the floating decimal point arithmetic operations.

The sub-system CSS is connected via a main connecting bus UMI to the maim memory unit or units MMU and the input-output unit(s) IOC.

The cache memory C of the processor P is in communication with the DIM unit via a connecting data processing bus BP-DT, and with the ACM unit via undirectional lines AC-AD for transfer of addresses between the ACM unit and the cache C.

The units ACM, DIM, ALM, PIM and SCM are interconnected via a connecting bus BUSA. Undirectional specific connection lines INST provide particular connections from the unit DIM towards the units PIM, ACM and ALM.

The invention intervenes essentially at the level of the DIM unit which is traversed by all the data relating to instructions and items of information requested or transmitted by the processor P during the implementation of a task.

The DIM unit essentially comprises buffer memories referred to as buffers. The contents and changes of the contents of these buffers are controlled by microprograms recorded in the CSU unit of the sub-system CSS, as described infra.

Referring to FIG. 2, a DIM unit forming the object of the present invention has been illustrated in diagrammatical manner.

This DIM unit comprises, in particular:

a program buffer BP of 16 octets or bytes, which stores the data relating to the instructions to be performed, two 16 octet read buffers RB0 and RB1, which store the information items relating to the data coming from the memory arrays of the system, a 16 octet write buffer WB which stores the information items relating to the data to be written in the memory array of the system, an 8 octet read trap buffer RT for processing sequence interruptions, and an 8 octet write trap buffer WT, equally for processing the sequence interruptions.

The cache C of the processor P is connected via the connection bus BP-DT to the input terminals of a first multiplexer M1. The output terminals of multiplexer M1 are connected via unidirectional lines B1 to the input terminals of the program buffer PB and to the input terminals of the read buffers RB0, RB1 and RT.

At the output side, the read buffers RD0, RB1 and RT are connected to a second multiplexer M2. The output terminals of this second multiplexer M2 are connected to the input terminals of a third multiplexer M3 via four conductors C1 to C4. The output terminals of the multiplexer M3 are connected via conductors C5 to C8 to the input terminals of a first circuit CA1 which aligns items of information relating to the data. The output terminals of the aligning circuit CA1 are connected to the input terminals of a fourth multiplexer M4 via four conductors C9 to C12. The output terminals of the multiplexer M4 are connected via the bus BUSA to the different units of the sub-system CSS.

The output of program buffer PB is connected:

to the input terminals of the second multiplexer M2, to the input terminals of a fifth multiplexer M5 via two conductors C13 and C14, to the input terminals of a second circuit CA2 that aligns items of information relating to instructions, via conductors C15 and C16, and conductors C17 and C18 connected to the output of the multiplexer M5. The output terminals of the second aligning circuit CA2 are connected via one-way connecting lines INST to the units PIM, ACM and ALM; the aforesaid connections B1 at the output of the first multiplexer M1 are also connected to the input terminals of the multiplexer M3 and to the input terminals of the multiplexer M5.

The connecting bus BUSA is connected to a third circuit CA3 which aligns items of information relating to data to be written into the memory array of the system. The output terminals of the third aligning circuit CA3 are connected via four conductors C5 to C8 to the input terminals of the write buffers WT and WB. The outputs of buffers WT and WB are connected via the connecting bus BP-DT to the memory array of the system.

Before describing the operation of unit DIM and more particularly its functions during performance of a task by the processor P, a preliminary definition of the structure of the information items which pass through this unit is given memory.

The items of information stored in the cache memory C, have several levels, each level includes a block of four words, wherein each word contains four octets, i.e., four 8 bit bytes.

The transfer between the cache C and the DIM unit occur by single or double words, i.e., 32 or 64 bit words and the transfer between the DIM unit and the connection bus BUSA affect from one to four octets. The specific lines INST may transmit data on two or four octets.

Let it be assumed that the processor P is actuated to perform a task. The implementation of this task gives rise to (1) the running of a program provided by a user and (2) having recourse to pre-stored microprograms which implement the instructions of the user program with adequate transfers of information items between the processing units of the processor P and the memory array of the system.

The program, which is assumed to be stored wholly or partially in the main memory unit MMU, is initialized by the system and then performed by considering possible sequence breaks.

After the system initializes the program, the first buffer of the DIM unit to be affected is the program buffer PB. The first operation to be performed by the sub-system CSS is the decoding of the first instruction of the program. This decoding action is performed by the PIM unit of the sub-system CSS.

Before describing the manner in which the information items are transmitted to the PIM unit so the PIM unit can decode the instruction, a description is given of the principal elements assuring control over the program buffer PB. These elements are four microfunctions on the one hand, and on the other hand are memory counters and pointers.

These four microfunctions are:

1. Microfunction IRP renders it possible to initialize the transfers of the items of information relating to instructions between the memory array of the system and the program buffer PB.

The address of the first instruction of the program which is to be read is derived by the ACM unit; the three least significant bits of the address of the first instruction establish the framing of the data relating to the instructions within the program buffer PB.

2. Microfunction SIN renders it possible to extract the octets of the data relating to the instructions present in the program buffer PB and to transmit these octets on oneway lines INST to the PIM unit; in particular with respect to the operational code of the instruction for calculating the address of the first microinstruction of the microprogram having the task of interpreting the instruction.

3. Microfunction EPR renders it possible to extract the octets of the program buffer PB to transmit the octets on the bus BUSA, starting from the fourth octet of the instruction having an operational code contained in the first octet transmitted to the PIM unit via the oneway lines INST.

4. Microfunction SIF has the task of transmitting requests to be transmitted to command the program buffer PB to be supplied with the octets of the following instruction of the program, if sufficient space is available in the program buffer PB.

As stated previously, the contents of the program buffer PB are equally under the control of a memory counter AMC and three pointers MP, AMP, BP (FIG. 6).

The memory counter AMC contains the number of octets (minus one) to be exchanged with the memory array of the system at the end of the previously initialised read request. This memory counter operates over a length of 5 bits, and a binary 1 for the most significant bit of this counter indicates that the contents of the counter are nil.

The pointer MP points at the next octet to be exchanged with the memory array of the system. This pointer operates over a length of 5 bits. The pointer BP points at the next octet to be exchanged with the bus BUSA. This pointer operates over a length of 5 bits.

The contents of the memory counter AMC and of the pointers MP, AMP and BP are quite obviously brought to light regularly and automatically as will emerge clearly from the following.

At this juncture it is possible to revert to the decoding of the first instruction of the programme which is to be performed.

To this end, the aforesaid first microinstruction IRP is implemented to initialise the transfer of the octets of the instruction between the memory array MMU and/or C of the system and the program buffer PB. The address of this first instruction is derived by the ACM unit; the three least significant bits of this address frame the instruction octet within the program buffer PB. The microfunction IRD allows reading of (1) a double word in the cache C of the processor P or in (2) in the memory array MMU of the system. This double word is transmitted into the program buffer PB, for example into the first eight octets of this latter.

With reference to FIG. 3, let it be assumed that the first four octets of the instruction containing information items indicated by octets A, B, C and D, respectively, are encountered again in the octets 2, 3, 4 and 5 respectively of the program buffer PB. In these circumstances, the information octet A is shifted two octets with respect to octet zero of the program buffer PB. This frame shift is indicated by the three least significant bits of the instruction. At the same time, the pointers MP, AMP and BP assume the values of these least significant bits. The memory counter AMC allocated to the program buffer PB assusmes the value which corresponds to the number of octets (minus one) which are to be read; octet A of the instruction is the first octet to be read and the process continues until a double word limit in the program buffer PB is reached. In the example illustrated in FIG. 3, six octets are read in such manner as to be framed on the octet 8 of the program buffer PB.

The first octets of the instruction should then be transmitted to the PIM unit which decodes an instruction operational code located in the first word (and more specifically in the first octet) of the instruction. This transfer is performed by the microfunction SIN which transmits the four octets A, B, C and D of the instruction to the PIM unit via the one-way lines INST.

However, the framing of the instruction in the program buffer PB should be taken into account, so that the octets A, B, C, D of the instruction may be obtained in the current order in the INST lines. In to FIGS. 3 and 4, operations associated with the transfer of the octets A, B, C and D are illustrated; this transfer is under the control of the table illustrated in FIG. 4. It is assumed that the program buffer PB appears in the form of a table having four lines and four columns. The columns being number from 0 to 3. The two least significant bits of the pointer BP establish the offset of the first octet A of the instruction within the word containing this octet, are also considered. This offset may consequently assume one of the values 0, 1, 2 or 3 (values shown in binary form in FIG. 4). In the example offered, the octet A is shifted two octets. In these circumstances, reference is made to line 3 of the table of FIG. 4 which indicates: the first octet to to transferred on the INST lines is the octet of information in column 2 (that is, octet A), the second octet to be transferred is the octet present in column 3 of the program buffer PB (that is the octet B), etc. This reframing action is performed by the aligning circuit CA2 of FIG. 2.

The length of the instruction is unknown at this stage. In contrast, the PIM unit which received the operational code of the instruction decodes the same and permits connection to a microprogram associated with this instruction. In this microprogram specific to this instruction, the microprogrammer writing the microprogram is thereby apprised of the nature of the instruction which is to be processed and consequently of its length. The other possible octets of the instruction are thereupon transmitted to the appropriate units of the sub-system CSS via the connecting bus BUSA under actuation by the microfunction EPR.

To implement microfunction EPR, the microprogrammer need merely specify the number of octets to be read without regard to the framing of these octets within the program buffer PB. These octets are transferred via the multiplexers M2 and M3 to the aligning circuit CA1, before being transmitted to the bus BUSA via the multiplexer M4.

According to an important feature of the invention, read requests may be transmitted automatically so that preliminary reading is possible of at least the first octets of the next instruction of the program which is to be performed. Thereby, these octets may be inserted into the program buffer PB beforehand, for so they can be of decoded by the PIM unit.

Such an automatic request may be called for by the microfunction SIN, subject to the condition however that there is sufficient space available within the program buffer PB, meaning that a double word is free, given that an automatic request works on a double word. The memory counter AMC is then obviously increased by 8 octets (8 octets of the double word).

A request of this kind may equally be called for by the microfunction SIF. This microfunction calls for a read operation on 8 octets if there is sufficient space in the program buffer PB and if the contents of the memory counter AMC are nil. Memory counter AMC is empty when all the octets of an instruction have been transmitted into the program buffer PB, meaning that there is no further need to transmit a read request to seek the missing octets of an instruction. In these circumstances, the microfunction SIF renders it possible to transmit a request to supply the instruction following the instruction which completes the processing.

The processing of these requests is described as transfers of information items relating to data. The conditions for implementing the different aforesaid microinstructions are equally examined infra.

Transfers applicable to data information items may be called during the implementation of the program. The read and write buffers of the DIM unit are then those which are affected.

As for the program buffer PB, the read buffers RB0, RB1, RT and write buffers WB, WT are associated with a memory counter AMC and with pointers MP, AMP and BP. These buffers are associated with a second memory counter BC which contains the number of octets (minus one) left to be exchanged between these buffers and the connecting bus BUSA.

To elucidate these transfers, an example of application is described in the following with reference to FIGS. 5 to 8.

During running of the program, an instruction may call for the transfer of data. The microprogram that implements this instruction is consequently induced to call, for example, for a chain of five octets A, B, C, D and E to be read. In a first example, assume that this chain of octets is stored in the cache C of the processor P with framing on a double word (FIG. 5).

Before performing a transfer of this kind between the cache C and the connecting bus BUSA, with traversal of the read buffers RB0, RB1 of the DIM unit, it is necessary to ascertain two complementary items of information, namely:

the address progression mode (+ or −) which involves ascertaining whether the successive octets are to be read by incrementing or decrementing the address, and the alignment of the chain of octets to find out whether it is justified to the left or right.

In the example illustrated in FIG. 5, the chain of five octets which is to be read is read in the address progression mode (+), is justified at the left and is framed on the limit of a double word.

The system is initialized to send this chain of octets in response to a microfunction IRD present in the microprogram having the task of implementing the instruction decoded by the PIM unit.

When the system is initialized by IRD microfunction, requests are transmitted by the DIM unit and the ACM unit towards the cache C which processes these requests.

Referring to FIG. 6, operations of several elementary processing cycles i0 to i3 are illustrated, to indicate implementation of a microfunction after initialisation, the transfer of the octets on the connecting bus BUSA and into the read buffer RB0, the transmission of the requests and the course followed by the different parameters associated with the read buffer RB0, namely BP, BC, MP, AMP and AMC.

Assume that microfunction IRD is initialised in cycle i0. Making allowance for this read initialisation instruction gives rise, during cycle i1, to a request DIRQ sent by the DIM unit to the ACM unit. During this same cycle, the ACM unit transmits a request ACRQ to the cache C which, in optimum conditions, responds during this same cycle with a signal RQA that is transmitted the DIM unit, thereby indicating that the request ACRQ is accepted.

Implementing microfunction IRD automatically reads out the different parameters associated with the read buffer RB0. For the example illustrated in FIG. 5, the pointer BP assumes the value 0 to indicate that the next octet to be exchanged with the connecting bus BUSA is the octet representing the data A situated at the octet 0 of the double word addressed in the cache C of the processor P. The counter BC assumes the value 4 to indicate the number of octets (minus one) remaining to be exchanged with the connecting bus BUSA (there are five octets to be transferred in the example). The pointer MP has a value 0 to indicate that the next octet to be exchanged with the cache C is the first octet or octet 0 of the double word addressed in the cache C. The pointer AMP has a value 0 to point to the first word or the next request to be exchanged with the cache C, this first word being the word 0 of the double word addressed in the cache. The counter AMC has a value 4 to indicate the number of octets (minus one) to be exchanged with the cache C when the current request is terminated. Because this request has not yet been implemented, there are consequently five octets to be transferred.

During the following cycle, i2, the cache C indicates, by transmitting a signal DTA towards the DIM unit, that the octets to be transferred are available on the connecting bus BP-DT connecting the cache C to the DIM unit. Analogously, the microfunction GET of the presently executed microprogram which follows the microfunction IRD assures control over the transfer of the octets to the connecting bus BUSA. Microfunction GET can be implemented only if the octets to be transferred are available in the read buffer RB0 or on the bus BP-DT. In the present case, wherein the cache has transmitted the signal DTA, the chain of octets which is to be read is ready to be transferred to the bus BP-DT. If the microfunction GET calls for the transfer of four octets (maximum four octets), the four octets are transmitted directly to the connecting bus BP-DT and directly towards the connecting bus BUSA; that is while passing through (a) the multiplexer M3, (b) the circuit CA1 for alignment of the octets (which operates like the aligning circuit CA2 described earlier for the program buffer), and (c) the multiplexer M4. By contrast, the four octets, A, B, C, D are not available in the read buffer RB0 until the following cycle, that is during the cycle i3.

During the cycle i2, only the pointer AMP and the counter AMC are actuated. The pointer AMP assumes the value 8 to point to the first word of the next request to be exchanged with the cache C, that is the octet 8 or the first octet of the following double word of the cache C. The counter AMC indicates the value (−1). The number of octets left to be exchanged with the cache C is actually zero since the read request relates to a double word of the cache, which double word contains the entirety of the chain of octets to be read.

The four octets A, B, C, D of the chain to be transferred are received in the read buffer RB0 during the following cycle i3. However, the octet E of the initial chain should still be transferred to the connecting bus BUSA. This transfer is performed by a second GET microfunction. As in cycle i2, the octet E and the three following octets are transmitted directly from the connecting bus BP-DT to the connecting bus BUSA, whereas these same four octets are present in the read buffer RB0 during the next cycle i4. The pointer BP, the counter BC and the pointer MP of the read buffer RB0 are actuated during the cycle i3. The pointer BP assumes the value 4 to indicate that the next octet which is to be exchanged with the connecting bus BUSA is octet 4 of the double word addressed in the cache C. The counter BC assumes the value 0 to indicate that one octet still remains to be transferred to the connecting bus BUSA (this counter actually assumes the value 0 since it indicates the number of residual octets minus one). The pointer MP assumes the value 4 to indicate the next word to be exchanged with the cache C, which word starts at the octet 4 of the double word addressed in the cache C.

The pointer BP, the counter BC and the pointer MP are both placed in action again at the start of the cycle i4. The pointer BP assumes the value 5 to indicate that the next octet to be exchanged with the connecting bus BUSA is the octet 5 of the double word addressed in the cache C. The counter BC assumes the value (−1), assuming that no other octet is left to be transferred to the connecting bus BUSA for the requests transmitted previously. The pointer MP assumes the value 8 to indicate that the next word to be exchanged with the cache C actually starts at octet 8, that is at the double word following the previously addressed double word of the cache C.

Figure 7:
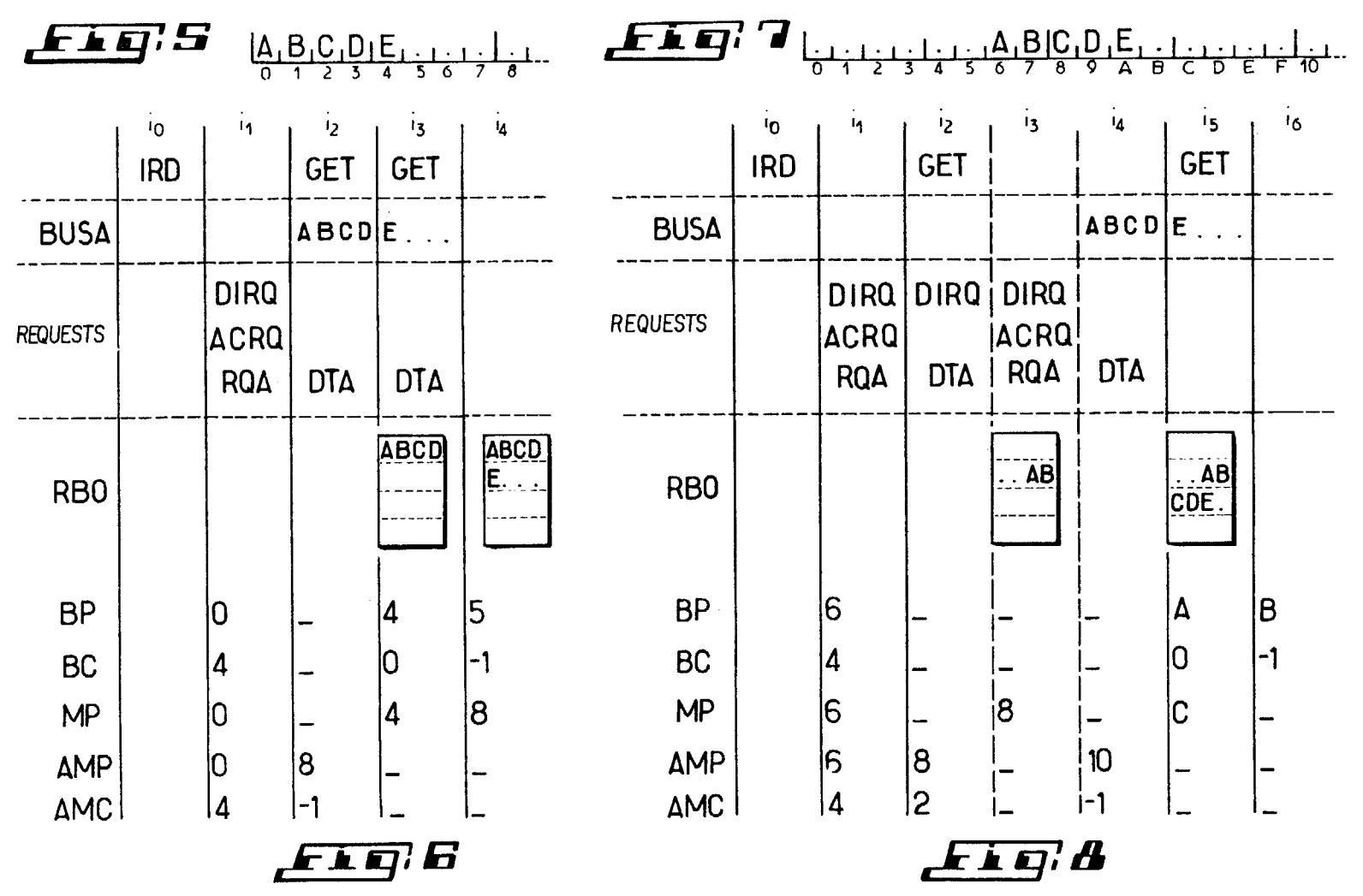

With reference to FIGS. 7 and 8, the transfer of a chain of 5 octets is equally described, but in the presence of a frame shift such that the chain of octets extends to either side of a double word limit in the cache C. This example differs essentially from the preceding example because it is necessary to call for two read requests at the level of the cache C, so the cache can transmit the chain of octets A, B, C, D, E. After initialisation of the read action by a microfunction IRD during cycle i0, read requests are transmitted to the cache C (during cycle i1) as previously, with actuation of the parameters BP, BC, MP, AMP and AMC. During cycle i2 in which a call is made for the transfer of the first four octets A, B, C and D towards the connecting bus BUSA under control by the microfunction GET, this microfunction cannot be performed given that these 4 octets are not available as yet.

Only the octets A and B are affected during the first read request, since they are present in the first double word addressed of the cache C. Cycle i4 must wait for the GET microfunction to be implemented as such, the octets C and D of the chain being transmitted directly from the connecting bus BP-DT to the connecting bus BUSA, whereas these two octets are not available in the read buffer RB0 until the next cycle. A second GET microfunction is needed to assure the octet E of the chain to the connecting bus BUSA. As before, the transfer of the octets of the chain are transferred via the aligning circuit CA1 before these octets are actually transmitted to the connecting bus BUSA.

This is the same microprogram which assures the transfer of the chain of octets of FIG. 5 as well as of the chain of octets of FIG. 7, since the microprogrammer need not make allowance for the possible frame shift of the octets.

An example of the transfer of a chain of octets between the connecting bus BUSA and the memory array of the system will now be described with reference to FIGS. 9 and 10, by considering the write buffer WB of the DIM unit.

Assume that a chain of eight octets A, B, C, D, E, F, G, H is to be transmitted from a processing unit of the sub-system CSS to the memory array of the system. This transfer is to be performed via the connecting bus BUSA connecting the different units of the sub-system CSS, and the write buffer WB of the DIM unit.

This chain of octets is assumed to be frame shifted with respect to a double word limit, as illustrated in FIG. 9. This example of the chain of octets corresponds to that which is assumed by this same chain of octets in the memory array. It will be understood that this frame shift is not taken into account at the level of the connecting bus BUSA which interprets this chain of eight octets as two words to be transferred at the rate of one word at a time to the write buffer WB of the DIM unit.

The initialisation of a transfer of this nature is performed by a microfunction IWT contained in the microprogram which is being implemented and which requests this transfer.

When the microfunction IWT is initialised, different requests are transmitted by the DIM unit and the ACM unit towards the memory array of the system, in particular to the cache C of the processor P having the task of processing these requests.

Referring to FIG. 10, several consecutive elementary processing cycles i0 to i7 have been illustrated, while indicating in the different cycles: the appearance of a microfunction after initialization, the transmission and acceptance of requests for implementation of this microfunction, the transfer of the octets from the connecting bus BUSA to the write buffer WB of the DIM unit, and from this write buffer to the memory array of the system, and finally the course followed by the different parameters associated with the management of the write buffer WB, being: BP, BC, MP, AMP and AMC.

The microfunction IWT is associated with a parameter, namely the length of the chain of octets to be written, that is eight octets in the present case.

Let the microfunction IWT be assumed to have been initialised in cycle i0. During this cycle i0, the four first octets A, B, C, D are available on the connecting bus BUSA and are available in the write buffer WB during the cycle i1. It is of importance to observe that the first octets A, B, C, D are transferred into the write buffer WB whilst passing through the aligning circuit CA3 (FIG. 2), so that these octets may be written into the memory array as a function of the possible frame shift established by the first bits of lesser weight of the address in the memory array of the item of information corresponding to the chain of octets which is to be written. This aligning circuit CA3 works on the same principle as the aligning circuit CA1 described earlier, except that the columns 0, 1, 2, 3 of the write buffer WB in which the four octets A, B, C, D are to be written consecutively, are considered this time as a function of the shift with respect to a word limit (in the present case two or ten in binary notation).

Since only the first four octets were taken into account by the initialising microfunction IWT, a microfunction PUT will at least follow the microfunction IWT to assure the transfer, from the connecting bus BUSA, of the other octets of the chain, at the rate of four octets per microfunction PUT. A microfunction PUT may evidently be placed on standby if insufficient space is available in the write buffer WB.

As from cycle i1, the write buffer WB may cause the transmission by the DIM unit of a request for a transfer towards the memory array of the system since its first double word is taken up although it contains no more than the first two octets A, B of the chain of octets which is to be transferred. The two octets A, B actually occupy the two octets 6, 7 of the first double word of the write buffer WB because of the frame shift indicated in FIG. 9.

This request DIRQ transmitted during cycle i1 by the DIM unit is sent to the unit ACM which during this same cycle i1 transmits a request ACRQ to the memory array, and in particular to the cache C. Under optimum conditions, this request may be accepted by the cache C during this very cycle i1 and made manifest by the transmission of a signal RQA to the DIM unit indicating the acceptance of the request.

The implementation of the microfunction IWT has the result of automatically activating the different parameters associated with the write buffer WB.

In the example illustrated, the pointer BP assumes the value A to indicate that the next octet to be exchanged with the connecting bus BUSA is the octer representing the datam E which should be located at the octet A of the write buffer WB containing 16 octers numbered from O to F. The counter BC assumes the value 3 to indicate the number of octets (minus one) remaining to be exchanged with the connecting bus BUSA (the four octets E, F, G, H remain to be transferred in the example). The pointer MP points at the octet 6 to indicate that the next octet to be exchanged with the cache C is the octet 6 of the write buffer WB. The pointer AMP equally assumes the value 6 to point at the octet of the write buffer WB which is to be exchanged with the cache C on the occasion of the next request for a transfer between the write buffer WB and the cache C. The counter AMC assumes the value 7 to indicate the number of octets (minus one) to be exchanged with the cache C when the current transfer request has been fulfilled. Given that this request has not been performed as yet, there are thus seven octets to be transferred.

During the following cycle i2, the cache C may indicate by the transmission of a signal DTA to the DIM unit, that it is ready to receive octets via the connecting bus BP-DT which is then available and connects the cache C to the unit DIM. In these circumstances, the second word of the write buffer WB which contains the first two octets A, B of the chain is transmitted to the connecting bus BP-DT.

An actuation of the pointers BP and AMP, and of the counters BC and AMC occurs during this cycle i2. The pointer BP points at the octet E of the write buffer WB to indicate the next octet available. The counter BC assumes the value ($-1$), given that no other octets are left to be transferred from the connecting bus BUSA to the write buffer WB. As a matter of fact, the four residual octets E, F, G and H are available as from cycle i2 in the write buffer WB as a result of the implementation of the PUT microfunction during cycle i1. The pointer AMP points at the octet 8 of the write buffer WB to indicate the next octet to be transferred to the cache C. This octet 8 corresponds to the octet C of the chain of octets which is to be transferred.

The counter AMC assumes the value 5 to indicate that six octets are actually left of the chain to be transferred from the write buffer WB to the cache C.

During cycle i2, the DIM unit automatically transmits a request DIRQ given that its write buffer WB has its second double word taken up. As before, a request ACRQ will be transmitted, and the DIM unit will receive a signal RQA transmitted by the cache C and appraising the DIM unit that the request has been accepted. During this cycle i3, the pointer MP is activated to point at the octet 8 of the write buffer WB thus indicating that this is the next octet which is to be transmitted to the cache C.

During cycle i4, the cache C transmits a signal DTA to the DIM unit to inform the latter that the connecting bus BP-DT is available for transmitting octets to the cache C at the rate of four octets per cycle, that is to say that the octets C, D, E, and F of the chain are transmitted to the cache C. The pointer AMP is actuated and points at the octet 10 or first octet of the double word which follows the last octet of the chain of octets. The counter AMC assumes the value (31 1) to indicate that there will be no other octets to be transferred to the cache C after completion of the current transfer request. As a matter of fact, since a request is applicable to a double word, the octets G and H which remain to be transferred to the cache C will be transferred during cycle i5 which corresponds to taking the second word of the request into account. During this cycle i5, the pointer MP is activated and points at the octet C of the write buffer WB to indicate the first octet to be transferred into the cache C, being the octet G of the two final octets G and H of the chain. During the next cycle i6, the pointer MP is actuated to point at the octet E of the write buffer WB, or next octet to be transferred into the cache C. This octet E follows the octet D of the write buffer WB which contains the last octet H of the chain transferred into the cache C during the cycle i5.

It may be observed in FIG. 10 that a write initialisation microfunction IWT may appear during cycle i2. This microfunction cannot actually be implemented, since the write buffer has no double word available during this cycle i2 for reception of items of information coming from the connecting bus BUSA. This microfunction is consequently placed on standby during the following cycles i3 to i5. It cannot be implemented until cycle i6, from the instant in which the transfer of the chain of octets A, B, C, D, E, F, G, and H is completed. This example perfectly demonstrates one of the automatic synchronisations performed by the system in accordance with the invention.

A series of observations should be made to complement in a more general manner the examples described in the foregoing.

The shift in alignment of the items of information may be any desired. In the case of the program buffer PB however, the item of information is actually aligned on the delimitation of a word or of a half-word.

The states of the different buffers of the DIM unit may simultaneously give rise to automatic requests for transfers of items of information. To control this problem, priority circuits are provided, which at a given instant validate the request having the highest priority. Before acceptance of an automatic request, its transmission is a function of the state of the pointers AMP and BP associated with the calling buffer, that is to say of the pointer pointing at the first word of the next request to be exchanged with the memory array, and of the pointer pointing at the next octet to be exchanged with the connecting bus BUSA.

In the case of the transfer of a chain, the microprogrammer may not be apprised of the length of this chain. It is sufficient for the same to install a transfer loop in its microprogram, the last octet of the chain being detected automatically by the DIM unit as a function of the state of the counter BC associated with the buffer in question (the value then assumed by this counter is $-1$).

The automatic and non-automatic transfer requests, the latter being initialised by microfunctions present in the microprogram, are placed on standby automatically if the items of information called for are not available in the buffers of the DIM unit.

Regarding the automatic transfer requests transmitted by the DIM unit as a function of the state of its buffers, it should be noted that an automatic request may be transmitted during the same cycle as that wherein is implemented a microfunction for transfer between the memory array and a read buffer of the DIM unit (GET microfunction) or that in which is implemented a microfunction for transfer between the connecting bus BUSA coupling the processing units and the memory array (PUT microfunction) in order to accelerate the transfer procedure.

It should equally be noted that the SIN microfunction associated with the program buffer PB equally renders it possible to assure the continual filling of this buffer by transmitting requests to the cache, evidently subject to the reservation that there is no request on standby and that sufficient space is available in the program buffer PB.

We claim:

1. Apparatus for managing data transfers between a memory array and different processing units of a digital data processing system while a task of the system is being implemented, the memory array beiing included in at least one of the processing units, the memory array including a cache memory, and a main memory unit, the at least one processing unit further including an input-output unit, a sub-system and computer means; the memory array, input-output unit and sub-system being connected to the other processing units by a main bus, the at least one processing unit including a source of microinstructions, the at least one processing unit including internal bus means interconnecting the microinstruction source, the computer means, the memory array and the sub-system, the apparatus comprising an interface unit in the sub-system, the interface unit being connected with the memory array and the main bus so signals are transferred between the interface unit and the processing units via the main bus, the interface unit including a write buffer, a read buffer and a program buffer; the microinstruction source including: (a) a pointer BP for identification of the next byte to be exchanged between the main bus and the interface unit, (b) a pointer MP for identification of the next byte to be exchanged between the memory array and the interface unit; and (c) a pointer AMP for identification of the first word of the next transfer request to be exchanged between the memory array and the interface unit, a first memory counter AMC for storing an indication of the number of bytes remaining to be transferred between the memory array and the interface unit when a currently executed transfer request is completed, a second memory counter BC for storing an indication of the number of bytes remaining to be transferred between the interface unit and the processing units of the system via the main bus, and means responsive to the microinstruction source for interconnecting the main bus, the internal bus, the memory array, the first and second memory counters and the program, read and write buffers for: loading the read buffer with information items relating to data transmitted from the memory array to the processing units via the main bus, loading the write buffer with information items relating to data transmitted from the processing units to the memory array via the main bus, controlling the program, read and write buffers in response to the count in the first counter and the pointers, and controlling the read and write buffers in response to the same count in the second counter, the buffers being controlled so that there are: automatic transfers of information items relating to first instructions between the memory array and the interface unit prior to the first instructions being performed, automatic transfers of first data from the memory array to the interface unit prior to the first data being used by the processing units, and automatic transfers of data from the processing units to the memory array, the automatic transfers being independent of microprograms performed in response to the microinstructions.

2. The apparatus of claim 1 further including first, second and third circuits for aligning information respectively supplied to the write buffer, derived from the read buffer and derived from the program buffer, the first, second and third aligning circuits automatically compensating for the framing of the information items respectively supplied to the write buffer, derived from the read buffer and derived from the program buffer, the framing being established by the least significant bits of a memory address of the information items.

3. The apparatus of claim 2 wherein each of the bytes consists of an octet, and each of the buffers has a length corresponding at least to a double word, one word including four octets.

4. The apparatus of claim 1 wherein each of the bytes consists of an octet, and each of the buffers has a length corresponding at least to a double word, one word including four octets.

* * * * *